Feb. 9, 1937.  H. E. KEYES  2,070,134
PREPARATION AND USE OF IRON AS A PRECIPITANT
Filed Oct. 6, 1934
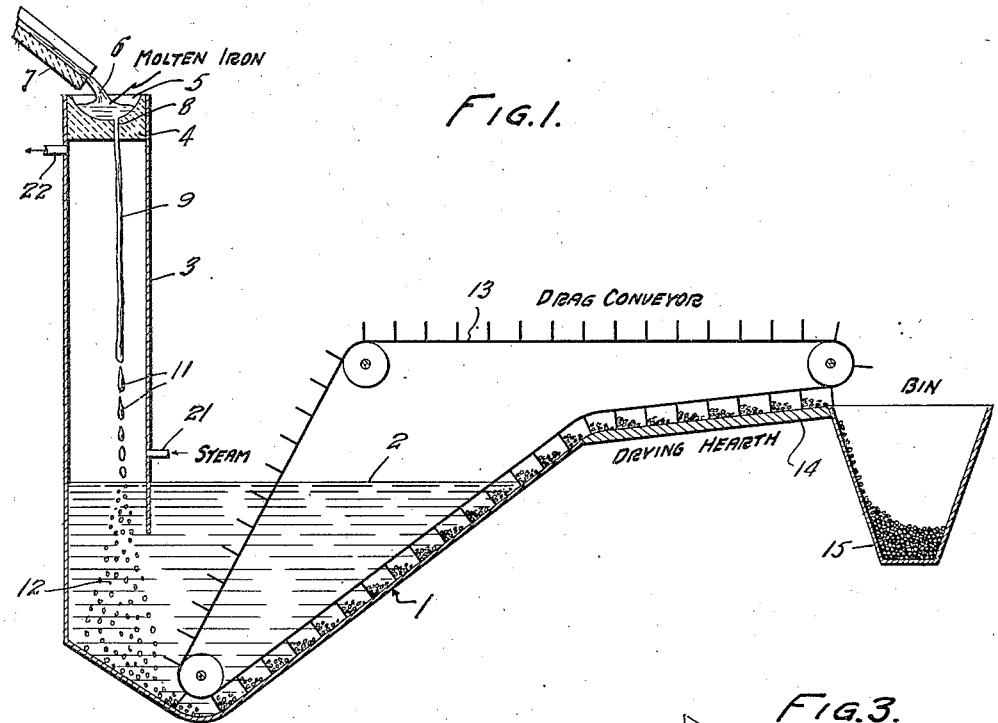
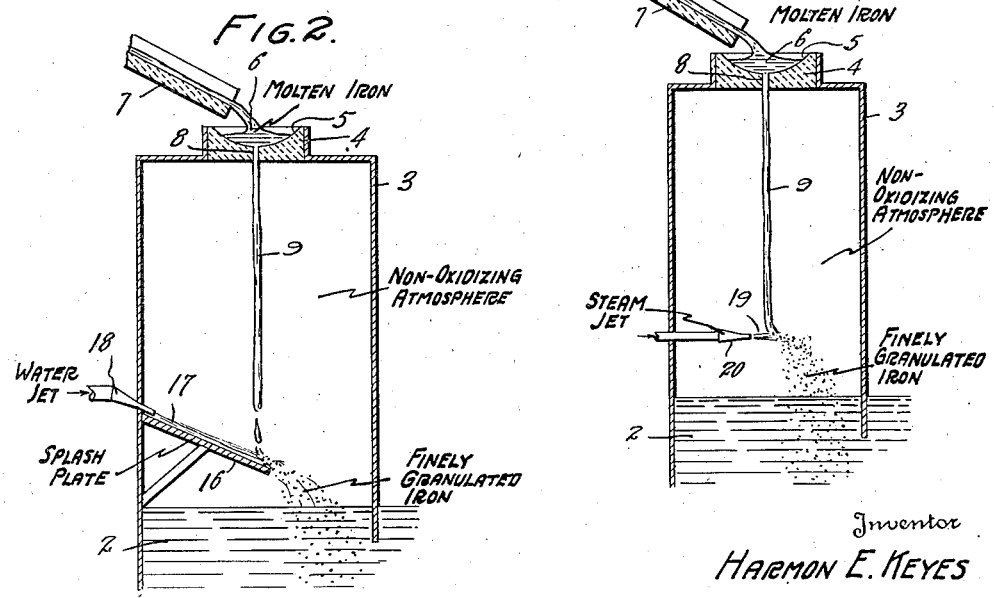
Inventor
HARMON E. KEYES
By Semmes & Semmes
Attorneys Patented Feb. 9, 1937

2,070,134

UNITED STATES PATENT OFFICE 2,070,134

PREPARATION AND USE OF IRON AS A PRECIPITANT

Harmon E. Keyes, Miami, Ariz.

Application October 6, 1934, Serial No. 747,256

10 Claims. (Cl. 75—109)

In certain metallurgical processes the use of metallic iron to precipitate another metal, such as copper, in elemental form has long been practiced. The method here described relates particularly, but is not necessarily confined, to the precipitation of cement copper by metallic iron, either from clear solution or in the pulp. In case of precipitation of copper in the pulp mechanical agitator tanks or rotating devices such as mills or drums have found use in practice. Either of the above types of precipitating devices may be applicable in the method here described. For example, the iron may be so finely divided as to permit of agitation in a stationary tank with a mechanical agitator, or it may be of any desired size and precipitation accomplished by rotation in a properly designed mill.

By my method iron is produced suitable for either type of precipitator and also improved results are accomplished in recovering cement copper by flotation because of the novel characteristics of the cement copper when precipitated by the form of iron produced, and under the conditions given, in my method here described.

In case of precipitating copper back into the pulp, such as originally described by Terry, 1,589,615, the ore containing oxidized copper is generally leached with sulphuric acid and agitated with metallic iron as in a mill or drum. According to later improvements treatment is given to inhibit re-solution of cement copper and to increase the floatability by regulation of the hydrogen ion concentration of the pulp solution as described in my Patent No. 1,971,416, and the copper is then recovered from the pulp by flotation. The method here described relates chiefly to improved means of producing a more suitable form of iron precipitant and to its use in conducting precipitation in conjunction with recovery of cement copper as aforesaid by flotation following precipitation in the pulp. However, said iron may also be used to precipitate copper from clear solution.

In conducting the above process according to former practice the securing of iron in a suitable physical and chemical form and also the tendency of cement copper to re-dissolve due to aeration after precipitation have been major problems. However, in my method the iron is easily produced in a form physically adaptable to use either in an agitator tank or drum and also chemically reactive to the copper solution, the resulting cement copper is readily amenable to recovery by flotation and the tendency to re-solution is much less than with cement copper produced by forms of iron previously employed, as will be hereinafter more fully described. In former practice either sponge iron or scrap has been used as a precipitant. Former attempts to subdivide molten iron by a jet of air or water or other means have failed to produce material suitable for precipitation due to inert coatings of magnetite formed on the particles during cooling. Sponge iron offers difficulties in technique of production and scrap iron presents problems in manipulation. Even when fine scrap, such as cut up tin or de-tinned scrap is employed a locked mass of jagged and irregular particles is formed in the precipitating mill which, in spite of the large surface exposed, entrains particles of cement copper within the mass and because of the short circuited copper-iron couple in copper solution thus formed, galvanic action causes growths of metallic copper nodules up to one-half inch or more in size which offer considerable annoyance and require special means or frequent shutting down and cleaning out of the entire charge in the precipitating mill for their elimination. In contradistinction to the above, my method offers the following distinctive and novel improvements—

1. The iron precipitant is cheaply and easily produced as rounded grains, prills or pellets by a special method of preparation involving breaking up a stream of molten iron by the aid of water or steam, ordinary forms of cheap iron such as field scrap, pig iron or molten iron from any source being used.

2. By the use of these small spheres or pellets, which may vary in size from minus 100 mesh up to the minimum size which could be conveniently cast individually, a high degree of mobility of the metallic iron particles in the charge is secured during the rotation of the precipitating mill. Thus, by reason of its freedom of action in moving about through the charge and its motion relative to the charge, a single particle of iron makes more efficient contact with the solution than does an equal iron surface but in other physical forms, so that small spheroid particles precipitate copper in a highly efficient and a novel manner.

3. Because of the high degree of mobility of the pellets of metallic iron in the charge and the absence of locked particles of flat metallic iron, metallic copper particles are not entrained in the charge but are freely discharged with the pulp, thus tending to prevent growth of copper granules which segregate in the drum.

4. By the use of small rounded iron pellets there is sufficient grinding action afforded during precipitation to grind up any large particles of cement copper so that growth of copper granules is also inhibited by this means.

5. By reason of the rounded shape and size of iron particles here employed the iron is easily retained in the drum in large excess and is not discharged with the pulp, even in case of using iron particles of very small size.

6. The copper is deposited on the iron particles as a crystal-like, dense plating which is readily dislodged as fine, thin flakes by abrasion of the iron particles. This crystalline form of copper is much more resistant to re-solution than ordinary flocculent cement copper as produced by the usual forms of scrap iron. This crystalline form of copper is made possible by use of iron produced according to my method.

7. The type of iron here employed is easy and cheap to handle, transport and feed mechanically, due to the rounded shape and small size of the individual particles.

8. The iron here employed is free from foreign matter such as rubbish and copper and brass scrap as is found in commercial reclaimed scrap iron or tin scrap.

9. Iron produced by this method is much more brittle than ordinary cast iron and may therefore be ground in the precipitating mill to a greater extent than ordinary iron, by employing means for impact; hence a relatively large amount of very finely divided iron may be thus produced which increases the precipitating action in the mill.

10. The iron pellets produced and used in this method are porous and in some cases definitely hollow, thus giving increased precipitating surface as compared to the usual solid form of iron of the same general shape and weight.

11. The iron pellets or grains produced by this method are free from the usual coating of magnetite which forms when molten iron cools in an oxidizing atmosphere. By employing my method the iron surfaces produced on the subdivided particles are clean, bright and chemically reactive to the copper sulphate solution. However, if the particles are exposed to air during cooling the surfaces are inert in the copper sulphate solution until the magnetite coating may be worn off.

12. The cement copper produced by this method being more dense and crystalline than the usual forms, the product resulting from treatment with the iron pellets settles much more rapidly than ordinary cement copper, hence the thickening and filtration steps in cement copper clean-up are greatly improved, cheapened and simplified.

13. Because of the rapid precipitating action of these small pellets and the possibility of crushing the pellets by impact in a mill, thus giving even greater precipitating action, this form of iron may be advantageously employed as an adjunct to precipitation using a ball mill and conducting grinding, leaching and precipitating simultaneously in the mill.

14. By employing suitable impact in a mill the iron grains or pellets produced by this method may be ground to any desired fineness, because of their brittleness, and used for various industrial purposes.

As distinguished from former practice my method employs as a principle of operation the subjecting of a falling stream of molten iron to the effect of impact accompanied by an atmosphere of steam or immersion in water so as to effect sub-division of the molten iron into small particles or pellets together with rapid cooling, out of contact with air, thereby producing small particles of iron free from the usual coating of magnetite scale. By quenching in water from the molten state the pellets are porous or sometimes hollow and furthermore a form of cast iron different from the usual types with respect to the state of combination of iron and carbon is produced. This treatment results in a very high percentage of combined carbon, giving a modified type of "white iron" which, due to its peculiar micro-structure of iron and carbon is not only extremely brittle and comparatively easy to crush by impact, but causes copper to be deposited from solution on its surface in a bright, dense and crystalline form as compared to the usual flocculent, loose and spongy cement copper resulting from the various forms of commercial iron formerly used. Furthermore, I have found this crystalline form of copper much more resistant to re-solution than is the usual form of cement copper above referred to.

I have diagrammatically shown in the accompanying drawing several devices for carrying out my invention. In this drawing:

Figure 1 is a diagram of a device in which relatively large pellets may be formed;

Figure 2 is a diagram of a device for producing finely divided iron and employing a splash plate for breaking up the stream of molten iron;

Figure 3 is a device also adapted to produce finely divided particles, but employing the use of a jet of steam in lieu of the splash plate.

If it is desired to produce relatively coarse particles, (for instance, from ¼" to ½") I prefer to use the device illustrated in Fig. 1. This device consists of a tank designated generally 1, which is adapted to hold a body of water 2, or some other non-oxidizing liquid. Extending upwardly from the body of liquid 2 is a pipe 3 which is closed at its upper end as at 4 by a block which is preferably composed of refractory material. The upper side of the block 4 is cut out to form a cup 5. Molten metal 6 is poured into the cup from a spout 7, or some other feeding means. A channel 8 is drilled from the cup through the block 4.

I have found that the channel 8 may be $\tfrac{5}{16}"$ in diameter, which provides for a stream 9 of molten metal of the proper size. It will be observed that the pipe 3 and block 4 are of a height which is sufficient for the stream 9 to break up into drops 11 prior to the time that the molten metal strikes the body of water 2. Upon striking the body of water 2, the metal is further subdivided and forms in rounded pellets, as indicated by the numeral 12. The body of water 2 is of sufficient depth so that the iron is solidified while falling and no agglomeration takes place in the base of the container.

A suitable drag or screw conveyor may be provided to remove the pellets from the base of the container 1, and I have shown in Fig. 1 a drag conveyor 13, which carries the pellets over a drying hearth 14 after they are removed from the water, and then discharges the dried pellets into a bin 15. I find that the iron formed in the apparatus of Fig. 1, is particularly adapted for use in a drum or mill precipitator. The pellets so formed are mainly ⅛" to ½" in diameter, thereby offering a sufficiently large surface for effective precipitation, but at the same time small enough to be fed mechanically and to be carried along in the pulp stream into the drum.

When the molten iron is poured directly into a body of water, as in Fig. 1, I have found that the pellets formed thereby are quite porous and, in some cases consist of hollow spheroids. This, of course, creates increased surface areas exposed to the copper solution, as opposed to solid particles of the same size and weight.

I have also found that cast iron chilled in water from the molten state precipitates a dense, coherent copper, rather than the usual flocculent, spongy and finely divided form encountered in practice. This coherent product is readily dislodged as thin flakes by mild abrasion so that in a precipitating mill clean iron surfaces are constantly exposed. This, of course, maintains a high precipitating efficiency and the cement copper thus produced is flaky rather than powdery and less susceptible to oxidation and re-solution than the usual form. Moreover, the extremely brittle nature of this type of iron makes possible its crushing and grinding by impact in the mill to a much greater extent than is the case with iron formerly used. Thus, the precipitating capacity of the mill may be enhanced by this increased production of finely divided iron during rotation. Therefore, processes which conduct grinding of the ore, leaching and precipitation simultaneously in a ball mill may use to advantage the form of iron produced by my method to increase the precipitating action in the mill.

In addition to the physical characteristics of iron produced according to my invention, I have found that the sudden chilling caused by pouring molten iron into water results in a type of iron-carbon combination not only more brittle than the usual forms of cast iron but other characteristics important for the copper precipitation step have been discovered.

In Figure 2, it will be observed that the stream of molten metal 9 is broken up by impacting upon a splash plate 16 which slopes downwardly from the pipe 3. It will be noted that the pipe 3 in Fig. 2 is somewhat larger than the pipe of Figure 1, although when using a splash plate the metal need not fall as great a distance as when it is poured directly into the water. I also prefer that a stream of water 17 be directed over the splash plate from a nozzle 18 or other suitable means. The size of the channel 8 in Fig. 2 may be the same as that in Fig. 1, but the finer subdivision of the iron accomplished in Fig. 2 is secured by the use of the splash plate. Furthermore, the stream of water 17 furnishes a shearing action by the metal impinging on the splash plate, thus contributing the sub-division of the metal, as well as sluicing the iron particles into the body of water below.

The exact conditions as to height of drop of the iron stream, inclination of the splash plate, size of opening for pouring the iron, amount of water added to plate and manner of collecting the iron are matters to be adjusted to suit specific requirements. By concentrating the stream of water at the point where the iron strikes the plate not only is the iron stream broken up into very fine particles but the plate is cooled at the point of impact with the iron and building up of iron on the plate prevented. Sticking of the molten iron on the plate is further prevented by use of a suitable refractory material. After the finely subdivided iron is cooled it is removed from the water by suitable means, such as a drag or screw conveyor, and is then rapidly dried to prevent oxidation. If part of this product is too coarse for treatment in the agitator type of precipitator such oversize is eliminated as by screening before use. The oversize is suitably used in the drum or mill type precipitator.

In Figure 3 I have shown a method of accomplishing subdivision of the stream 9 of molten metal by the use of a jet of steam 19 which is directed on the stream 9 by a nozzle 20. The use of the steam jet usually result in a relatively fine sub-division of the metal, but proper control of the jet will vary the size of the iron as desired. It will be appreciated that under certain conditions, some other inert gas may be employed in lieu of steam.

The conditions relative to the rate of water and iron addition may be so regulated as to produce a temperature within the pipe 3 which is sufficient to produce an atmosphere of steam therein, thus preventing oxidation of the iron particles. If desired, however, additional steam may be introduced as at 21 in Fig. 1, and may discharge through the outlet 22. While I have shown the use of steam in Fig. 1 only, it is, of course, apparent that it may be used in such apparatus as shown in Figs. 2 and 3, when desired. Also, it will be appreciated that a suitable drag conveyor and drying arrangement may be employed in Figs. 2 and 3.

From the foregoing it will be noted that the fundamental feature of my invention is the subdivision of molten iron into small particles or pellets under reducing or inert conditions so that the usual magnetite coatings on the iron surfaces is inhibited. Any one of the foregoing devices is sufficient to achieve this result and the particular apparatus used will depend largely upon the size of the particles desired and the exigencies of any particular operation.

Regardless of the manner of conducting precipitation the pulp is subjected to flotation after precipitation for recovery of the cement copper as well as any remaining sulphide copper values. In treating cement copper as produced by former standard types of iron the re-solution problem is one of large proportions unless inhibited by means such as adding alkaline precipitant as described in my Patent No. 1,971,416. However, I have found that the cement copper produced by iron prepared as in this method has different characteristics and is not dissolved by the aeration treatment to nearly the extent as is the case with cement copper produced from forms of iron previously used.

The conducting of this method and the novel results accomplished will be more clearly illustrated by the following examples.

(1) Iron was poured through $\frac{1}{8}$" hole through an empty 50 gal. steel drum shell set on top of a similar drum half full of water. An inclined splash plate was set over the water and the stream of water directed onto the plate at point of iron impact. The iron was broken up into fine particles and washed into the body of water below. Particles that were washed directly into the water showed clean bright metallic iron surface. When conditions were properly regulated, the molten iron was broken up into minute spheres.

(2) Conducted similar to (1), but removed splash plate and filled lower drum with water, pouring iron directly into water. The iron did not fly into the air on striking the water, but broke up as pellets having the following screen analysis:—

| | Per cent |
|---|---|
| +1 inch | None |
| +.525 inch | 6.44 |
| +.263 inch | 44.45 |
| +10 mesh | 46.70 |
| +28 mesh | 1.99 |
| +48 mesh | 0.29 |
| +100 mesh | 0.08 |
| −100 mesh | 0.05 |
| | 100.00 |

The uniform size of this material is characteristic of this method of preparation. The surfaces were free from magnetite coatings, the material so brittle it could be crushed to small particles and the interior of the particles had a high percentage of voids. Density tests showed the material to weigh 197 lbs. per cubic foot as compared to 260 lbs. for solid regular cast iron balls worn down to the same diameter as the pellets. These cast iron balls could not be broken with a hand hammer on a steel plate as was done with the pellets, indicating the latter to be much more brittle than ordinary cast iron.

(3a) Precipitation tests were made, using cut up tin can scrap, steel turnings, cast iron turnings and the quenched pellets prepared by my method. Similar amounts of neutral copper sulphate solution were added to each type of iron in a separate beaker. After standing about an hour it was found that all samples except the quenched pellets had a loose and spongy type of cement copper deposit which readily became dislodged and broke into a fine sludge. However, the chilled pellets produced a lighter colored deposit of bright copper with a metallic luster which became dislodged by mild abrasion and formed thin scales or flakes resembling metallic copper ground into flakes.

(3b) The above test was repeated, using small cast iron balls in comparison with the chilled pellets. The copper which deposited on the regular cast iron balls was also spongy, flocculent and loose as before, while the deposit on the chilled pellets was more crystalline, coherent, dense and bright.

(4) Complete laboratory tests were made illustrating leaching, precipitation and cement copper flotation, using the chilled iron shot pellets to precipitate the copper in the leached pulp and employing a laboratory size wooden drum as the precipitator. The samples of leached pulps were cut from the final leaching agitator in a commercial scale operation.

(a) The first preliminary test employed a 2½ liter bottle with hand shaking for precipitation. Using an ore charge of about 1200 grams at 45 percent solids, together with 2082 grams of iron, minus 0.525" and plus 10 mesh, and by hand shaking the copper precipitation was complete in 15 minutes, as shown by sodium sulphide test. Flotation was conducted with 0.125 lb. of a relatively insoluble organic sulphur derivative compound and 0.10 lb. pine oil per ton ore. The assays and copper distribution were as follows:

| | Concentrate | Middling | Tailing |
|---|---|---|---|
| Assay, percent copper | 36.19 | 1.52 | 0.085 |
| Distribution, percent | 83.74 | 5.06 | 11.20 |

The head value was calculated at 0.73 per cent copper.

(b) Further similar tests were run using 7100 grams of the chilled iron pellets and shot in a laboratory rotary drum, the samples representing approximately 2100 grams of solids and the percent solids being 40–45. Precipitation of copper was complete in 15 minutes and was followed by flotation with 0.07 lb. of the said relatively insoluble organic sulphur derivative compound and 0.06 lb. pine oil per ton ore. The rougher concentrate was re-floated in a cleaner, thus giving a final concentrate, cleaner reject and tailing as products. Tests were run without and with addition of lime between copper precipitation and flotation, the function of the lime being to inhibit resolution of cement copper. The following results were obtained without using lime:

| Percent | Heads | Cleaner | | Tailing | |
|---|---|---|---|---|---|
| | | Concn. | Reject | Solution | Solids |
| Copper assay | 1.51 | 60.85 | 7.37 | 0.060* | 0.14 |
| Copper distribution | 100.00 | 64.00 | 27.09 | 0.29 | 8.62 |

*Assay in pounds copper per ton solution.

Addition of sufficient lime prior to flotation and after iron treatment so as to precipitate 5–10 percent of the dissolved iron gave the following results:

| Percent | Heads | Cleaner | | Tailing | |
|---|---|---|---|---|---|
| | | Concn. | Reject | Solution | Solids |
| Copper assay | 1.44 | 63.17 | 5.86 | 0.018* | 0.14 |
| Copper distribution | 100.00 | 67.00 | 23.86 | 0.09 | 9.05 |

*Assay in pounds copper per ton solution.

The last two tests show a satisfactory grade of concentrate and all three tests gave a satisfactory tailing. More effective flotation could be secured by using additional flotation reagent. These tests show that both a high grade concentrate and a low tailing may be simultaneously produced by using the iron pellets as above described. Furthermore it was noted that the copper thus produced occurred largely as very fine flakes which retained their metallic luster and settled much more rapidly than the powdery cement copper produced by ordinary iron. It is a noteworthy fact that the ordinary cement copper as usually produced in standard flotation tests with tin scrap as a precipitant shows by laboratory test about 3.0 per cent of the precipitated copper re-dissolved during flotation without use of lime and 1.4 per cent similarly redissolved if lime is used as aforesaid. By comparing these re-solution figures with the above tests using the chilled iron pellets it is seen that this re-solution is cut to about one tenth of its normal value by using iron prepared according to my method, thus solving one of the main obstacles in cement copper flotation.

In summary, this method not only furnishes an economical iron supply from adequate sources, but produces iron in a more suitable form, the precipitation treatment resulting in a new type of cement copper for flotation which is more readily settled and filtered and has a much less tendency to re-dissolve during the treatment process, as compared to cement copper produced from the usual types of metallic iron formerly employed. Furthermore, the thin, minute flakes of copper produced by this method gives it advantages for use as a base for copper paints and pigments. The fineness of the cement copper flakes is governed somewhat by the abrasive action in the mill, which in turn is controlled by the peripheral speed and the lifters installed in the mill.

As pointed out above, my invention is applicable either when the copper is precipitated from a pulp or from clear solution, and the appended claims are to be considered as covering both types of process. Furthermore, the term "abrasive" as used in the appended claims is to be construed as covering attrition or impact as well as strict abrasion.

While I have shown and described the preferred embodiment of my invention, I wish it to be understood that I do not confine myself to the precise details herein set forth by way of illustration, as it is apparent that many changes and variations may be made therein, by those skilled in the art, without departing from the spirit of the invention, or exceeding the scope of the appended claims.

I claim:

1. In a process for precipitating copper by contacting the copper solution with metallic iron, the step of preparing the precipitant by pouring molten iron in a small stream, breaking up said molten iron stream into rounded particles, introducing said particles into a bath to solidify them, adding said particles to the copper solution, and then crushing said particles in the presence of the solution.

2. In a method of precipitating copper by iron, the step of preparing the precipitant by pouring molten iron onto a solid surface to sub-divide the iron into a plurality of particles, cooling said sub-divided iron particles under non-oxidizing conditions and then adding said iron particles to a copper bearing solution.

3. In a process of precipitating copper by iron, the steps of preparing the precipitant by pouring molten iron in a small stream, breaking up said molten iron stream into rounded particles by the action of a jet of inert gas, solidifying the said particles out of contact with air, and then adding the iron particles so produced to the copper bearing solution.

4. In a process for precipitating copper by contacting the copper solution with metallic iron, the step of preparing the precipitant by pouring molten iron in a small stream into a non-oxidizing atmosphere, breaking up said molten iron stream into rounded particles, solidifying said particles out of contact with air, and adding said particles to the copper solution.

5. In a method of precipitating copper by iron, the step of preparing the precipitant by pouring molten iron onto a solid surface to sub-divide the iron into a plurality of particles while at the same time directing a sheet of water across said surface, cooling said sub-divided iron particles under non-oxidizing conditions and then adding said iron particles to a copper bearing solution.

6. In a process for precipitating copper by contacting a leached pulp with metallic iron, the steps of preparing the precipitant by pouring molten iron into a bath of non-oxidizing liquid, cooling the iron in said bath, adding said iron to the copper solution to precipitate copper upon the iron and dislodging the precipitated copper from the iron by an abrasive action.

7. In a process for precipitating copper by contacting a leached pulp with metallic iron, the steps of preparing the precipitant by pouring molten iron into a bath of a non-oxidizing liquid to thereby form rounded particles of the iron, adding said particles to the copper solution, and dislodging the precipitated copper adhering to said particles by subjecting the particles to an abrasive action.

8. In a process for recovering copper by contacting a leached pulp with metallic iron and then subjecting the pulp to flotation, the steps of preparing the precipitant by pouring molten iron into a bath of non-oxidizing liquid, cooling said iron in the liquid, adding the iron to the copper solution in a rotary mill which is provided with a grinding medium, and passing the effluent pulp from the mill to a flotation stage.

9. In a process for precipitating copper by contacting dissolved copper with metallic iron, the step of preparing the precipitant by pouring molten iron in a small stream, breaking up such iron stream into rounded particles, and introducing said particles into a bath of non-oxidizing liquid to solidify them.

10. In a process for precipitating copper by contacting dissolved copper with metallic iron, the step of preparing the precipitant by pouring molten iron into a bath of non-oxidizing liquid, cooling the iron in said bath, adding said iron to a copper solution, and then crushing the iron in the presence of the solution.

HARMON E. KEYES.

Patent No. 2,070,134　　　　　　　　　　　Granted February 9, 1937

HARMON E. KEYES

The above entitled patent was extended October 2, 1951, under the provisions of the Act of June 30, 1950, for 6 years and 83 days from the expiration of the original term thereof.

*Commissioner of Patents.*